United States Patent

Dauphin

[11] Patent Number: 6,057,760
[45] Date of Patent: May 2, 2000

[54] METHOD AND DEVICE FOR DETECTING INTRUDERS BY EMITTING AND RECEIVING ULTRASOUND WAVES IN AN AUTOMOBILE VEHICLE

[75] Inventor: Paul-Frédéric Dauphin, Créteil, France

[73] Assignee: Valeo Electronique, Creteil, France

[21] Appl. No.: 09/145,630

[22] Filed: Sep. 2, 1998

[30] Foreign Application Priority Data

Sep. 2, 1997 [FR] France .................................. 97 10891

[51] Int. Cl.[7] .................................................. G08B 13/18
[52] U.S. Cl. ...................... 340/552; 340/426; 340/541; 340/554
[58] Field of Search ................... 340/552, 541, 340/545.2, 545.3, 553, 554, 426, 425.5, 531

[56] References Cited

U.S. PATENT DOCUMENTS

| | | | |
|---|---|---|---|
| 3,733,581 | 5/1973 | Kalmus | 340/426 |
| 4,961,039 | 10/1990 | Yamauchi et al. | 340/554 |
| 5,510,765 | 4/1996 | Madau | 340/541 |
| 5,677,666 | 10/1997 | Stalbohm | 340/426 |
| 5,808,544 | 9/1998 | Kani et al. | 340/426 |
| 5,856,778 | 1/1999 | Kani et al. | 340/426 |
| 5,867,091 | 2/1999 | Chard | 340/426 |

FOREIGN PATENT DOCUMENTS 0 654 768  5/1995  European Pat. Off. .
38 11 113  10/1988  Germany .

OTHER PUBLICATIONS

French Search Report dated Jun. 4, 1998.

*Primary Examiner*—Daniel J. Wu
*Assistant Examiner*—Toan Pham
*Attorney, Agent, or Firm*—Morgan & Finnegan LLP

[57] ABSTRACT

In accordance with the method, the received signal is quadrature demodulated by mixing it with two signals with a relative phase difference of $\pi/2$ and having the same frequency as the emitted carrier, the absolute value of each of the demodulated signals of each pair of signals obtained is compared to a respective threshold to determine valid pairs if the absolute value of at least one of the two demodulated signals is higher than the threshold and invalid pairs otherwise and the number of successive rotations of the vector whose coordinates correspond to the values of the signals of the successive valid pairs is counted. For each invalid pair the value of the count is progressively reduced. The alarm is tripped if the value of the count reaches a given threshold.

12 Claims, 3 Drawing Sheets

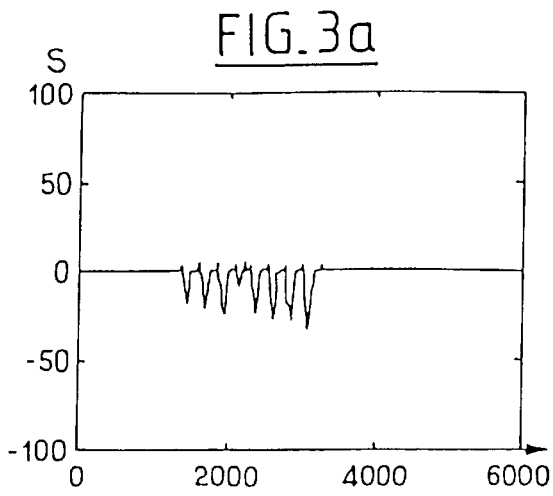
FIG_3a
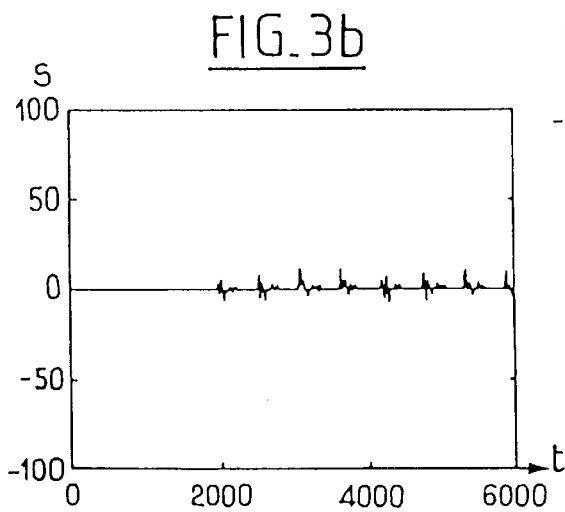
FIG_3b
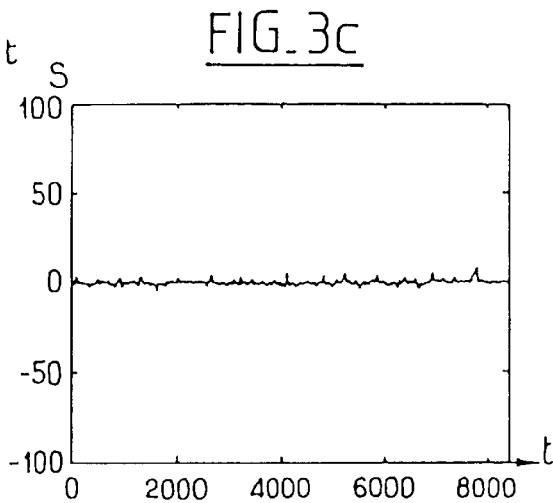
FIG_3c
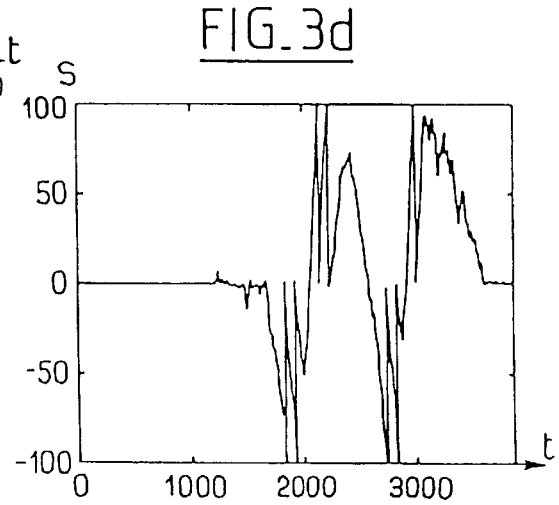
FIG_3d

METHOD AND DEVICE FOR DETECTING INTRUDERS BY EMITTING AND RECEIVING ULTRASOUND WAVES IN AN AUTOMOBILE VEHICLE

BACKGROUND OF THE INVENTION

The present invention concerns detecting intruders by emitting and receiving ultrasound waves in an automobile vehicle.

With conventional ultrasound detection techniques the vehicle contains an ultrasound field which is a combination of the waves emitted and reflected inside it. This field is stationary or quasi stationary when the environment of the vehicle is calm or at least not subject to major modifications.

Movement is generally detected by amplitude or phase demodulation of the ultrasound wave received at the receiver and then analyzing the demodulated wave in accordance with a number of cumulative criteria, such as the amplitude, the duration and the frequency of the detected signal.

For example, intrusion may be considered to be characterized by the presence of a signal level above a given threshold for frequencies below 8 Hz (low frequencies) or for frequencies in the range 10 Hz to 20 Hz (high frequencies).

However, the above intrusion detection techniques cannot totally avoid the risk of false alarms.

In particular, thermal shock to which the vehicle may be subject generates low frequencies in the demodulated signal and can be confused with intrusion. Similarly, impacts to the roof or the windows of the vehicle result in high frequency modulation in the analyzed signal and therefore can also be erroneously confused with intrusion.

Another important problem encountered with techniques employing amplitude demodulation relates to the fact that they necessitate a variable gain given that the signal is dependent on the level of the carrier and that if the carrier is saturated information is lost.

Document DE 38 11 113 A discloses a detection method and a detector device in which ultrasound waves received are detected by quadrature demodulation and the rotation of the vectors whose components are the pairs of demodulated signals obtained is analyzed.

However, a device of the above kind is essentially intended for detecting intruders in dwellings and would not be suitable for the specific environment of an automobile vehicle.

In this specific environment various kinds of phenomena occur that must not be considered to be intrusion, including:
  isolated or repeated light impacts on various places on the bodywork or the windows of the vehicle,
  vibration of low amplitude but of long duration, cause for example by the starting up of the cooling system or the air conditioning system when the vehicle is stopped,
  the presence of insects in the passenger compartment, and thermal shock to which the vehicle is subjected.

The above phenomena are characterized by received waves having highly diverse characteristics and a principal aim of the invention is to detect intrusion by emitting and receiving ultrasound waves in an automobile vehicle with the capability for good discrimination between phenomena of the above kind and actual intrusion into the vehicle in order to minimize the risk of false alarms.

BRIEF SUMMARY OF THE INVENTION

To this end the invention proposes a method for detecting intrusion into an automobile vehicle in which ultrasound waves are emitted inside the vehicle and a signal which is a combination of waves emitted and reflected inside said vehicle is received at a point inside the vehicle, characterized by the following steps:
  the received signal is quadrature demodulated by mixing it with two signals with a relative phase difference of $\pi/2$ and having the same frequency as the carrier of the emitted ultrasound waves to obtain a pair of demodulated signals,
  the absolute value of each of the demodulated signals of each pair of signals obtained is compared to a respective threshold value to determine pairs of valid signals if the absolute value of at least one of the two demodulated signals is higher than the respective threshold value, and invalid pairs otherwise,
  a process of counting the number of successive rotations of a vector whose coordinates correspond to the values of the successive valid pairs of signals is processed,
  for each invalid pair, the value of the count of the number of rotations is progressively reduced, and
  the tripping sounding of an alarm is commanded if the value of the count of the number of rotations reaches a given threshold.

The above method is advantageously complemented by the various following features alone or in all technically possible combinations:
  the value of the count of the number of rotations is reduced by multiplying that value by a coefficient in the range 0 to 1.
  the value of the multiplier coefficient is chosen according to the required degree of immunity to noise.
  a bidirectional counting process is employed, depending on the direction of rotation of the vector, and the tripping of an alarm is commanded if the absolute value of the count of the number of rotations reaches a given threshold.
  the demodulated signals are sampled and converted into numerical values, a plurality of identical quadrants are defined in the plane of rotation of the vector and a counter is incremented up or down if the vector whose coordinates correspond to the numerical values of the demodulated signals passes from one quadrant to another by rotating in one direction or another.
  there are eight quadrants.
  the demodulated signals are filtered to eliminate variations in the signal having a frequency greater than half the sampling frequency.

The invention also concerns a device for detecting intrusion in an automobile vehicle including means for emitting ultrasound waves and receiving means, characterized in that the receiving means include demodulating means for quadrature demodulation of the received signal by mixing said signal with two signals with a relative phase difference of $\pi/2$ and having the same frequency as the carrier of the emitted ultrasound waves, comparator means for comparing the absolute value of each of the demodulated signals of each pair of signals obtained to a respective threshold value and thereby to determine pairs of valid signals if the absolute value of at least one of their two demodulated signals is higher than the respective threshold values, and invalid pairs otherwise, counting means for counting the number of successive rotations of a vector whose coordinates correspond to the values of the signals of the successive valid pairs, means operative on each occurrence of an invalid pair to reduce progressively the value of the count of the number of rotations, and means for commanding the tripping of an alarm if the value of the count of the number of rotations reaches a given threshold.

Preferred but non-limiting aspects of the device in accordance with the invention are as follows:

the comparator means, the counting means and the command means comprise one and the same microcontroller at the input of which the demodulated signals are sampled and converted into numerical values.

the means for reducing the value of the count comprise multiplier means adapted to multiply the value of the count by a coefficient in the range 0 to 1.

the device further comprises time-delay means for selectively switching into service during a predetermined first period at least the processing and counting means, for maintaining said means in service beyond said predetermined first period for as long as a variation in the count of rotations is established, and for switching said means out of service during a predetermined second period at the end of said predetermined first period if no variation in the count has been established during said first period.

said processing and counting means are maintained in service if the number of rotations determined at the end of said predetermined first period is higher than a threshold.

BRIEF DESCRIPTION OF THE DRAWINGS

Other features, aims and advantages of the invention will become more apparent from the following description. The description is purely illustrative and not limiting on the invention. It must be read in conjunction with the accompanying drawings, in which:

FIGS. 3a through 3d are graphs as a function of time of the evolution in the value of a counter that commands the tripping of an alarm when it is above a given threshold respectively in the case of repeated impacts to the windows of the vehicle, in the case of repeated impacts to its windshield, if the vehicle is subject to a thermal shock and in the case of intrusion.

DETAILED DESCRIPTION OF THE INVENTION

Figure 1:
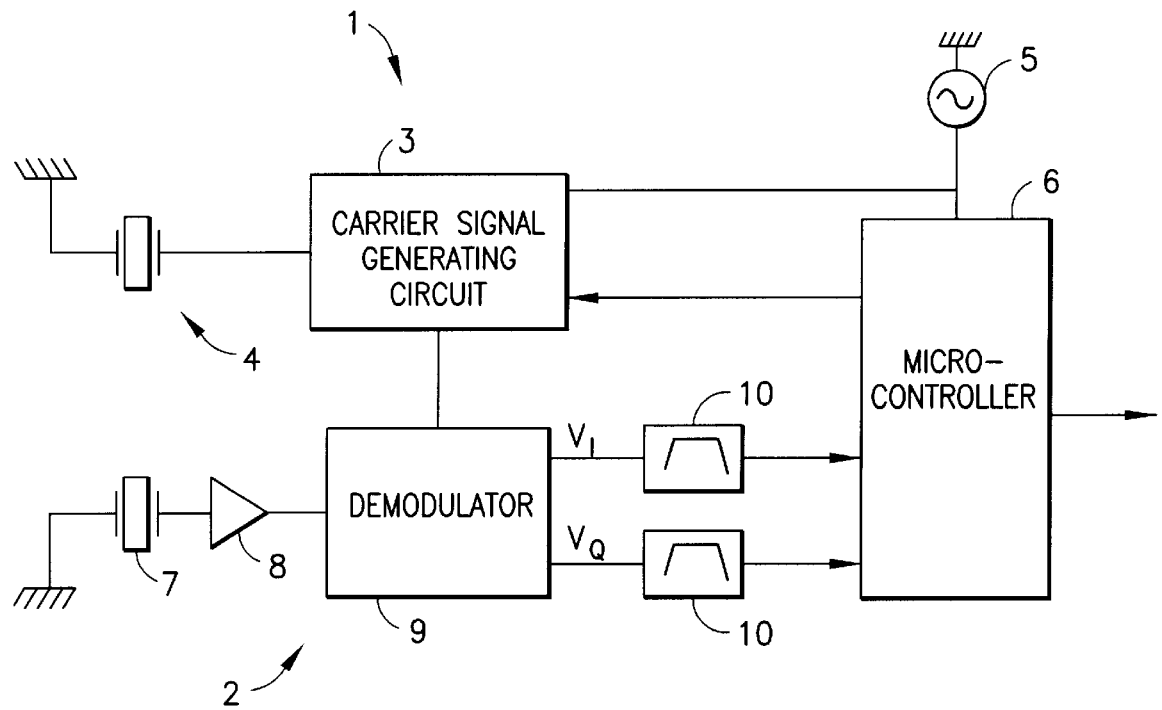
FIG. 1 is a schematic representation of one embodiment of a device in accordance with the invention.

The intruder detector device represented in FIG. 1 includes emitting means 1 and receiving means 2.

The emitting means 1 include a circuit 3 for generating a carrier signal and a transducer 4, for example a piezoelectric transducer, which receives the voltage signal at the output of the circuit 3 and emits an ultrasound signal.

The frequency of the carrier signal is 40 kHz, for example. This signal is generated by the circuit 3 form a clock signal produced by a quartz crystal oscillator 5. The frequency of the clock signal is 4 MHz, for example, in which case the circuit 3 is a circuit which divides the frequency by 100.

The circuit 3 generating the carrier is further controlled by a microcontroller 6 using the signal output by the quartz crystal oscillator 5 as a clock signal.

The receive means 2 include a receive transducer 7 which converts the ultrasound signal it receives into a voltage signal and an amplifier circuit 8 between the output of the transducer 7 and the input of means 9 for amplitude demodulation of the signal at the output of the amplifier circuit 8.

The demodulator means 9 have two output channels VI and VO in quadrature, the respective signals on which are obtained by multiplying the signal at the output of the amplifier means 8 by two signals with a relative phase difference of $\pi/2$ and having the same frequency as the carrier.

Each of the two processing channels $V_I$ and $V_Q$ includes a band-pass filter 10 which filters out slow variations in the signals obtained—which are due to changes in the environment of the vehicle, for example the changing ambient temperature during the day—and filters out variations in the signal that represent frequencies which are too high to correspond to an intruder.

The signals at the output of the two filters 10 are fed to analog/digital converting inputs of the microcontroller 6 where they are sampled at a frequency of 1 kHz, for example.

The absolute values of the numerical values I and Q obtained for each of the two channels $V_I$ and $V_Q$ are compared to threshold values $S_I$ and $S_Q$.

Figure 2:
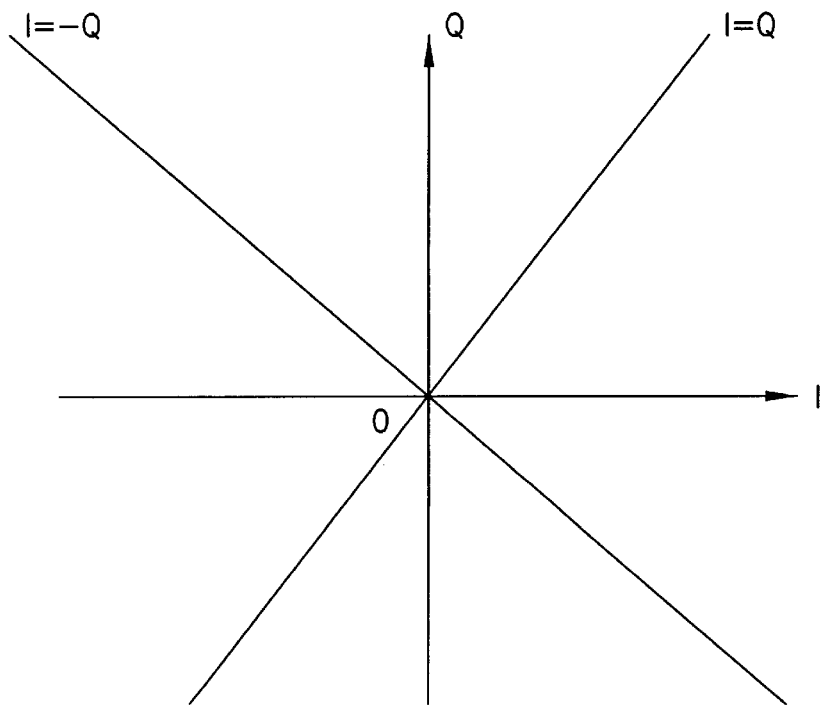
FIG. 2 is a graph representing division of the complex plane into eight quadrants, this division being used in the detection processing implemented by the device from FIG. 1.

If at least one of these absolute values is greater than the respective threshold value $S_I$ or $S_Q$, which means that the complex two-dimensional vector whose components are the numerical values I and Q has a length greater than a particular limit, and is representative of a valid pair for detection of intrusion, then the microcontroller 6 processes the pair of values I and Q to determine the position of the aforementioned complex vector relative to the eight quadrants of the complex plane which are shown in FIG. 2 and which are defined by the following straight line segments:

I=0, I=Q, Q32 0, I=−Q.

The processing employs a comparison of the absolute values of I and Q with each other followed by determination of the quadrant of the complex plane in which the vector with coordinates (I, Q) lies on the basis of the result of the aforementioned comparison and the sign of the values taken by I and Q.

The microcontroller 6 includes a counter which is incremented up or down when the vector that corresponds to the pair of values (I, Q) passes from one quadrant to another in the complex plane respectively by rotation in the anticlockwise direction and in the clockwise direction.

Determining the rotation direction consists in choosing whichever of the two directions corresponds in the complex representation to a rotation angle less than $\pi$ between the new valid vector with coordinates I, Q and the previous valid vector.

If, on the other hand, each of the numerical values I and Q determined at the input of the microcontroller 6 for each of the two channels $V_I$ and $V_Q$ is below the corresponding threshold value $S_r$ or $S_Q$, which indicates that the corresponding vector is not valid, in other words that it must not be taken into account in analyzing the rotation, then in this case the microcontroller reduces the value of the rotation counter.

The value of the counter can advantageously be multiplied by a coefficient k which is in the range 0 to 1 and which can take different values depending on the type of vehicle and the degree of tolerance required vis à vis spurious phenomena, for example.

For a large vehicle where good immunity to noise is required, especially when the windows are partly open, the multiplier coefficient k can be ⅛, for example. In contrast, in the case of a smaller vehicle with a lower noise immunity, k can be chosen as equal to ⅗, for example.

By these means the value of the counter is processed so that it is progressively reinitialized in this way if the values I and Q assume values close to 0 several times in succession, which values a priori correspond to spurious phenomena such as thermal shock or vibration.

In a variant of the invention, the length of the vector could be calculated in the form $(I^2+Q^2)^{1/2}$ and this length compared to a single threshold value.

Note that discriminating between valid vectors and invalid vectors has the advantage of reducing the electrical power consumption of the microcontroller since the relatively long calculation phase of determining the angle of the vector and comparing it with the angle of the previous vector is avoided for each invalid vector. This discrimination also circumvents tolerances specific to the components of the device and in particular tolerances in respect of the gain of the ultrasound sensor.

When the value of the counter reaches a given threshold S, from above or from below, intrusion is considered to have taken place and the microcontroller 6 issues a signal to command the tripping of an alarm. Thus the comparison is effected on the absolute value of the count.

The alarm tripping threshold S is equal to 100, for example, which corresponds to 12.5 successive turns of the vector with coordinates I, Q one way or the other in the complex plane.

FIGS. 3a through 3d show examples of variations in the value of the counter in different situations.

As can be seen in these figures, in the case of slight mechanical impacts to the windows or to the windshield of the vehicle (FIGS. 3a, 3b) or in the case of thermal shock (FIG. 3c) the counter is regularly reinitialized to zero in a progressive fashion and the maximal values that it takes are low.

Vibration and thermal shock generate disorderly oscillation of the vector with coordinates I, Q. The counter is therefore successively incremented up or down in a substantially random fashion. Progressive reinitialization in the case of successions of invalid vectors also contributes to keeping the value of the counter at a low level.

In contract, a relatively continuous movement within the vehicle causes rotation of the vector with coordinates I, Q in one direction that is dependent on the direction of the movement relative to the transducer 7. Consequently, in the case of intrusion (FIG. 3d), the counter of the microcontroller 6 quickly reaches values corresponding to the detection threshold S. Even if the movement specific to an intrusion has some discontinuity, the fact that the counter is reinitialized progressively between the different phases of any such movement means that the count of rotations is not completely reinitialized between the various phases so that it is more certain to reach the triggering threshold value.

Of course, other values of the sampling frequency or the carrier frequency than those indicated for the example just described can be chosen.

Note that the choice of carrier frequency and sampling frequency is related to the maximal value of the speed of intrusion that is to be detected.

It is known that the modulating frequency fm of the signal received at the transducer 7 satisfies the equation:

$$v = c - c \cdot fp/(fp+fm)$$

where v is the speed of intrusion, c is the speed of sound in air (approximately 340 m/s) and fp is the carrier frequency.

Correct detection of the rotation direction can occur only if the rotation of the vector with coordinates (I, Q) is less than one half-turn from one sampling operation to another.

For a sampling frequency of 1 kHz the maximal frequency of the modulated signal must therefore be less than 500 Hz, which corresponds to a maximal detectable intrusion speed of 3.7 m/s.

The filters 10 are tuned to the sampling frequency. With the aforementioned values for the carrier frequency and the sampling frequency the filters 10 are chosen to eliminate signals with frequencies above 500 Hz.

Equally, depending on the required sensitivity of the device, values other than 100 can be considered for the threshold S, in particular in order to detect repeated impacts to the windows of the vehicle. Similarly, the threshold values $S_r$ and $S_Q$ can be adjusted.

Figure 4:
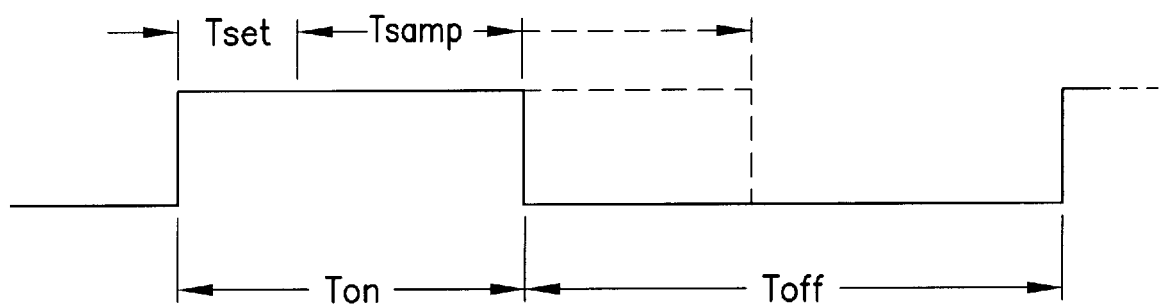
FIG. 4 is a timing diagram for the switching into service and out of service of a variant of the device in accordance with the invention.

An auxiliary feature of the detector device in accordance with the invention will now be described with reference to FIG. 4. Its main object is to reduce electrical power consumption to enable the device to be used during prolonged periods of non-use of the vehicle without risking completely discharging the battery of the vehicle.

In accordance with this feature, time-delay means control an activate/deactivate input of the microcontroller 6 (such as a wake-up terminal) or, if appropriate, the whole of the electrical power supply of the device except for that of the time-delay means themselves, so that the device is operational during a predetermined first time period Ton.

During this period a first phase Tset is dedicated to initializing the various circuits and at the end of this phase, during a phase Tsamp, the microcontroller operates as previously described. If at the end of this phase no variation in the rotation count has been established the device is deactivated for a predetermined second period Toff which is advantageously longer than the period Ton.

If there are variations in the rotation count during the phase Tsamp, which signifies that an intrusion may be in the process of detection, then the period Tsamp is extended for as long as such variations exist, i.e. until the value of the count is progressively reduced to zero by a succession of invalid vectors. The period of inactivity Toff is then initiated.

The existence of variations in the rotation count during phase Tsamp is preferably determined by comparing the number of rotations determined to a given threshold, below the intrusion detection threshold, and extending this phase Tsamp if the number of rotations at the end of the normal duration of this phase is above the threshold.

The invention has been described herein using digital means but could of course be implemented using analog means.

I claim:

1. A method for detecting intrusion into a vehicle in which ultrasound waves are emitted and reflected inside the vehicle comprising:
   obtaining a pair of quadrature demodulated signal by mixing a signal comprising a combination of the waves emitted and reflected with two reference signals having a relative phase difference of π/2 and having the same frequency as a carrier of the emitted ultrasound waves;
   comparing the absolute value of each of the demodulated signals of each pair of signals obtained to a respective threshold value to determine pairs of valid signals if the absolute value of at least one of the two demodulated signals is higher than the respective threshold value, and invalid pairs otherwise;
   counting the number of successive rotations of a vector whose coordinates correspond to the values of the successive valid pairs of the demodulated signals;

reducing progressively for each invalid pair, the value of the count of the number of rotations if the demodulated signals are lower than the respective threshold value; and commanding the tripping of an alarm if the value of the count of the number of rotations reaches a given threshold.

2. A method according to claim 1, wherein the reducing reduces the value of the count of the number of rotations by multiplying that value by a coefficient (k) in the range 0 to 1.

3. A method according to claim 2, wherein the value of the coefficient (k) is chosen according to predetermined degree of immunity to noise.

4. A method according to claim 1, wherein a bidirectional counting process is employed, depending on the direction of rotation of the vector.

5. A method according to claim 4, further comprising:

sampling the demodulated signals, converting the sampled signal into numerical values, defining a plurality of identical quadrants in a plane of vectors, and incrementing or decrementing a counter if the vector whose coordinates correspond to the numerical values of the demodulated signals passes from one quadrant to another by rotating in one direction or another.

6. A method according to claim 5, wherein there are eight quadrants of vector plane.

7. A method according to claim 1, further comprising filtering the demodulated signals to eliminate variations in the signal having a frequency greater than half the sampling frequency.

8. A device for detecting intrusion in an automobile vehicle including an ultrasound wave emitter and a receiver in which ultrasound waves are emitted inside the vehicle and a signal which is a combination of waves emitted and reflected inside the vehicle is received at a point inside the vehicle, comprising:

a demodulator for obtaining a pair of quadrature demodulated signal by mixing the signal from the receiver with two reference signals having a relative phase difference of $\pi/2$ and having the same frequency as carrier of the emitted ultrasound waves, a comparator, associated with the demodulator, for comparing the absolute value of each of the demodulated signals obtained to a respective threshold value to determine pairs of valid signals if the absolute value of at least one of two demodulated signals is higher than the respective threshold values, and invalid pairs otherwise, a processor, associated with the comparator, for counting the number of successive rotations of a vector whose coordinates correspond to the value of the demodulated signals of the successive valid pairs and for reducing the value of the counter on each occurrence of an invalid pair of signals, and an alarm generator, responsive to the processor, for generating an alarm if the value of the count of the number of rotations reaches a given threshold.

9. A device according to claim 8, wherein the comparator, the processor and the alarm generator comprise a single microcontroller.

10. A device according to claim 8, wherein the processor further includes a multiplier means adapted to multiply the value of the count by a coefficient in the range 0 to 1.

11. A device according to claim 8, further comprising time-delay means for selectively switching into service during a predetermined first period at least the processor, for maintaining the processor in service beyond the predetermined first period for variation in the count of rotations is established, and for switching the processor out of service during a predetermined second period at the end of the predetermined first period if no variation in the count has been established during the first period.

12. A device according to claim 11, wherein the processor is maintained in service if the number of rotations determined at the end of the predetermined first period is higher than a threshold.

* * * * *